United States Patent [19]
Pavey

[11] 3,965,522
[45] June 29, 1976

[54] HEADLAMP WASHER SYSTEM

[75] Inventor: John S. Pavey, Anderson, Ind.

[73] Assignee: General Motors Corporation, Detroit, Mich.

[22] Filed: June 23, 1975

[21] Appl. No.: 589,352

[52] U.S. Cl. ............................ 15/250.04; 15/250 A; 15/250.3
[51] Int. Cl.² .......................................... B60S 1/46
[58] Field of Search .................. 15/250.01–250.09, 15/250.1, 250.25, 250.29, 250.30, 250 A, 250.22

[56] References Cited
UNITED STATES PATENTS

| | | | |
|---|---|---|---|
| 3,548,440 | 12/1970 | Kothari | 15/250.01 |
| 3,641,613 | 2/1972 | Povilaitis et al. | 15/250 A |
| 3,893,203 | 7/1975 | Berkelius | 15/250.3 |

FOREIGN PATENTS OR APPLICATIONS

| | | | |
|---|---|---|---|
| 481,141 | 5/1953 | Italy | 15/250.3 |

*Primary Examiner*—Peter Feldman
*Attorney, Agent, or Firm*—D. F. Scherer

[57] ABSTRACT

A headlamp washing system wherein the liquid pressure source which supplies liquid to wet the headlamp surface also supplies liquid to actuate a linear motor which drives the wipers to remove the liquid and foreign matter from the headlamp surface. A flow restriction is disposed between the liquid pressure source and the dispensing nozzles adjacent the headlamp so that sufficient pressure and flow capacity are maintained by the liquid pressure source upstream of the restriction to operate the linear fluid motor which moves the wiper on the headlamp surface.

2 Claims, 2 Drawing Figures

HEADLAMP WASHER SYSTEM

This invention relates to headlamp washing systems and more particularly to headlamp washing systems having a fluid actuated motor.

Prior art headlamp washing systems use an electric motor or a vacuum motor to actuate the wiper blade for movement across the surface of the headlamp. The use of an electric motor, in such systems, is more expensive than the use of a linear fluid power actuated spring return motor. If a vacuum linear motor is used, a separate power source, such as inlet manifold vacuum must be available. Also additional hoses or tubing must be installed for the vacuum system.

The present invention uses a linear motor that is operated by liquid. The source of liquid power for the motor is the same source which delivers the liquid to the headlamps for cleaning. The hoses which direct the liquid to the headlamp for washing are also connected to the linear motor. Thus with the present invention, the less expensive linear motor is used and the additional vacuum hoses are eliminated.

It is an object of this invention to provide an improved headlamp washing system in which a single source of liquid is used to supply cleaning liquid and to power the wiper actuator motor.

Another object of this invention is to provide an improved headlamp washing system wherein a liquid pump supplies superatmospheric pressure to nozzles disposed on the headlamp wipers mechanism and to a liquid actuated motor for moving the wiper mechanism, and wherein a flow restriction upstream of the nozzles maintains the pump pressure sufficiently high to actuate the motor while liquid is being dispensed on the headlamps through the nozzles.

These and other objects and advantages of the present invention will be more apparent from the following description and drawings in which.

Figure 1:
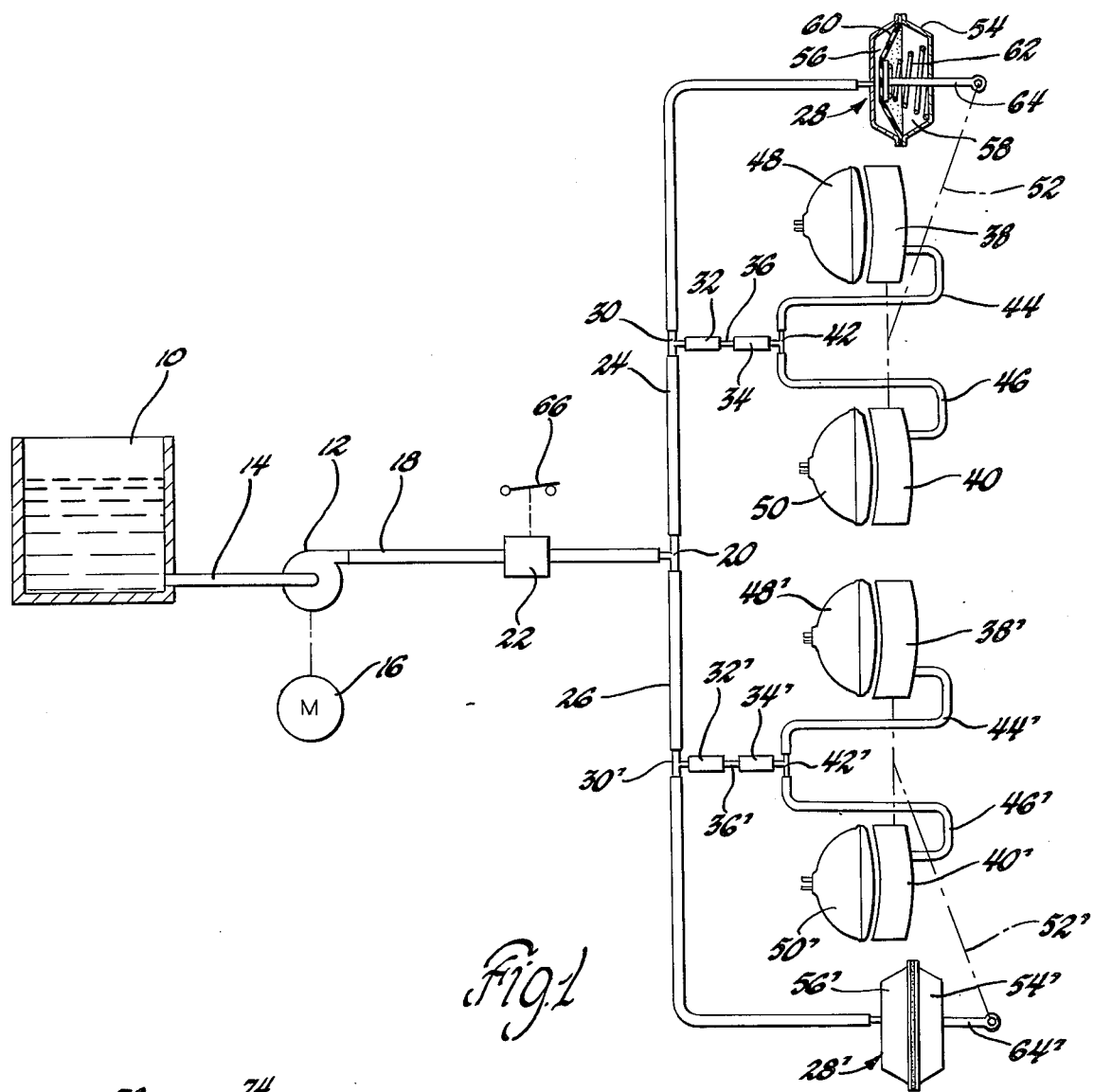
FIG. 1 is a schematic representation of a headlamp washing system.

Referring to the drawings wherein like characters represent the same or corresponding parts, there is shown in FIG. 1 a liquid reservoir 10 which is in fluid communication with a centrifugal pump 12 through a passage or tubing conduit 14. The pump 12 is preferably driven by an electric motor 16 and is of the centrifugal type. In particular, the pump may be similar in construction to the centrifugal type liquid pump used with windshield washer systems. The pump 12 delivers liquid fluid pressure through a passage or tubing 18 to a tee 20. A conventional pressure switch 22 is disposed in the passage 18 to provide an electrical control signal as will be explained later.

The tee 20 branches into a liquid passage 24 and a liquid passage 26. The liquid passage 24 is in fluid communication with a conventional linear motor 28 and through a tee 30 to passage 32. The passage 32 is connected to a passage 34 through a restriction 36. The passage 34 is connected to a pair of headlamp wipers 38 and 40 through a tee 42 and passages 44 and 46, respectively. The passages 44 and 46 each have a nozzle, not shown, disposed on the ends thereof as typically found in headlamp washing systems. The wipers 38 and 40 are adapted to be driven linearly across headlamps 48 and 50, respectively, by the linear motor 28.

The passage 26 provides fluid communication through a liquid linear motor 28' and to a pair of headlamp wipers 38' and 40' through a passage 32' and restriction 36' in a manner the same as that described above for passage 24. The fluid connections with passage 26 are given with the same numerical designation as those described above for passage 24 except that primes have been added to the numeral.

The wipers 38, 40, 38' and 40' are driven by the linearly actuated motors 28 and 28' through linkages 52 and 52', respectively. These linkages and the wiper construction may be constructed in accordance with the headlamp washer system disclosed in U.S. Ser. No. 515,184, filed Oct. 16, 1974, and assigned to the assignee of the present invention.

The motors 28 and 28' are preferably constructed of a two-piece housing 54 which is divided into a fluid chamber 56 and in an atmospheric chamber 58 separated by a diaphragm 60. The diaphragm 60 is urged toward the fluid chamber 56 by a spring 62. An output rod 64 is secured to the diaphragm 60 such that movement of the diaphragm will result in movement of the rod 64.

When the pump 12 is driven by the electric motor 16, the pump 12 supplies liquid under pressure to the passages 18, 24 and 26. The fluid in passage 24 acts on the fluid motor 28. Part of the liquid is delivered to the headlamp wipers 38 and 40, to supply liquid for cleaning the headlamp lens, through the tee connection 30 and the restriction 36. The fluid in passage 26 is delivered to the linear motor 28' and to the headlamp wipers 38' and 40' in a manner similar to that described above. The restrictions 36 and 36' prevent all of the fluid delivered by pump 12 from being directed out of the passages on to the headlamp surfaces. These restrictions 36 and 36' cause a pressure build-up in passages 24 and 26, which pressure is sufficient to operate the fluid motor 28 and 28'. When the headlamp wipers 38, 40, 38' and 40' have reached the end of their wiping stroke, the pressure switch 22 has sufficient pressure operating thereon to open an electrical switch 66 which will cause the motor 16 to cease rotating. When the motor 16 ceases to rotate, the pump 12 becomes inoperable and the spring 62 in the motor 28 will push the diaphragm back to the starting position, as shown, so that the headlamp wiper system is in position for a second cycle should the operator desire to initiate one. Thus it can be seen from the above description that the headlamp wipers are actuated by liquid from the same source that delivers liquid to wet the headlamp surfaces to accomplish the cleansing operation. The restriction 36 and 36' could be placed directly on the end of passages 44, 46, 44' and 46' to obtain the same results, however, it has been found that better balance will occur if restrictions 36 and 36' are separated from the dispensing nozzles which are disposed on the passages 44, 46, 44' and 46'. The construction of linear motor 28' is the same as linear motor 28 and it is considered that the operation will be the same for both motors.

Figure 2:
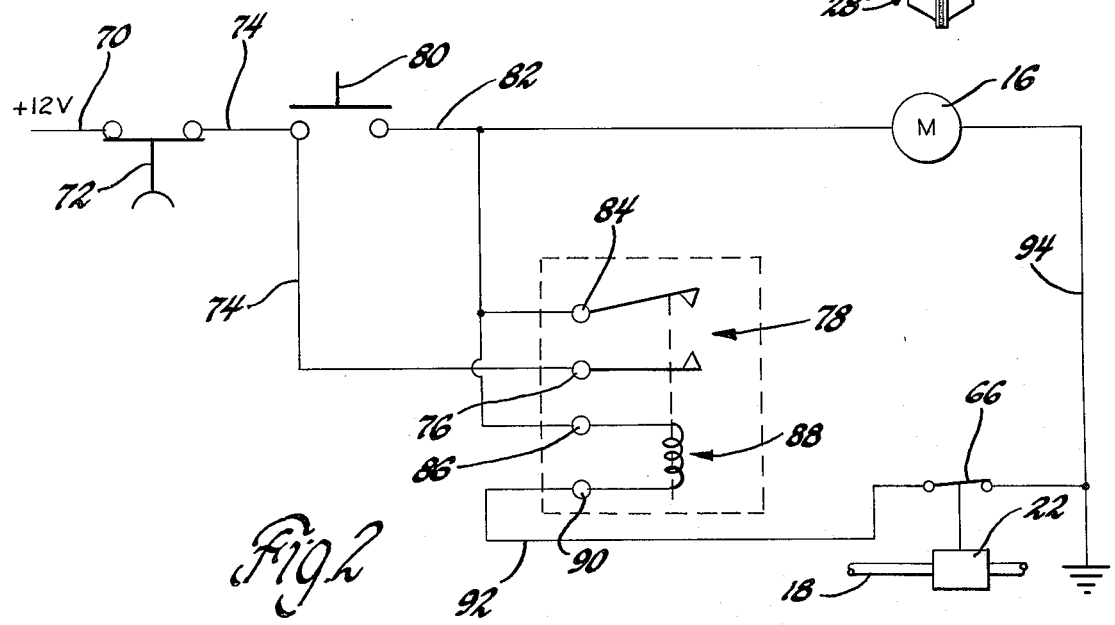
FIG. 2 is a schematic of an electrical system which may be used with the headlamp washing system shown in FIG. 1.

The electric motor 16 and switch 66 are components of the electrical system shown on FIG. 2. The electrical system shown on FIG. 2 is connected through a wire 70 to a 12-volt source, such as a car battery, and then through a switch 72 to a wire 74. The wire 74 is connected to a terminal 76 of a relay contact switch 78. The wire 74 is also connected to a manually operable switch 80. One contact of the manually operated switch 80 is connected to an electric wire 82 which is connected to the electric motor 16 and to terminal 84 of the relay switch 78. The wire 82 is also connected to a terminal 86 of a relay solenoid 88. The other terminal 90 of relay solenoid 88 is connected by a wire 92 to the switch 66. The switch 66 and motor 16 are connected through a wire 94 to ground.

When the operator desires to actuate the headlamp washer, he momentarily closes switch 80 which causes electric current to flow via wire 82 through motor 16 and through the relay solenoid 88. Current in the solenoid 88 causes closure of the relay switch contact 78 such that when the manual switch 80 is released, current continues to flow through the switch contacts of switch 78 to continue operation of motor 16 and also continue energization of solenoid relay coil 88. The switch 66 remains closed until the wipers reach the end of their wiping stroke and the pressure output of pump 12 increases sufficiently to cause opening of the pressure switch 22. When the switch 66 is opened, the ground connection for solenoid relay coil 88 is interrupted and therefore current flow through the coil 88 ceases. When current flow through solenoid relay coil 88 ceases the switch contacts 78 are opened and prevent further current flow through the motor 16 which, therefore, ceases to operate. As explained above, when the motor 16 is no longer operating, the springs 62, of the linear motors 28 and 28', drive the motors back to the position shown. The switch 80 needs only momentary contact closure to initiate operation of the cycle. The switch 72 is included in the system and may be incorporated into the vehicle ignition system which would insure that the vehicle ignition is in the "On" position and in most instances the engine running when the headlamp washer system is actuated.

The pressure switch shut-off for the system could be replaced with an electronic timer system. The electronic timer system could be constructed in accordance with generally accepted timing circuits with semiconductor elements and it is not considered that showing the timing system is necessary. The timer could be constructed such that the actuator motors 28 and 28' would have sufficient time after start-up of electric motor 16 to cause one sweep of the headlamps for cleaning at which time the motor would be timed out by the timing circuit. Again, when the motor 16 ceases to operate, the spring of the motors 28 and 28' would return the motors to their starting position. It may also be found in some installations that the reservoir 10 is in the position of higher altitude than the dispensing nozzles on hoses or tubing 44 such that it may be desirable to incorporate a solenoid operated valve in passage 14 or 18 so that the reservoir 10 will not be drained by gravity during inoperative periods. The solenoid valve could be controlled by another set of relay switch contacts operated by coil 88 or by a time circuit if the timing type shut-off is used.

Obviously, many modifications and variations of the present invention are possible in light of the above teachings. It is, therefore, to be understood that within the scope of the appended claims the invention may be practiced otherwise than as specifically described.

What is claimed is:

1. In a headlamp cleaning system comprising; wiper means adapted for movement across the surface of the headlamp; nozzle means disposed on said wiper means for dispensing liquid on the surface of the headlamp; actuator means connected with said wiper means for controlling movement of said wiper means; the improvement comprising; pump means for supplying liquid at superatmospheric pressure; and passage means for communicating liquid from said pump means to said actuator means and said nozzle means, and including restriction means downstream of said actuator means and upstream of said nozzle means for maintaining the pressure of the liquid at a sufficient superatmospheric pressure level to actuate said actuator means and for controlling the flow of liquid through said nozzle means whereby a single source of liquid provides power to operate said actuator and supplies cleaning liquid for the system.

2. A headlamp cleaning system comprising; electric motor driven liquid pump for supplying liquid at superatmospheric pressure; actuator means responsive to liquid pressure for supplying an output force; wiper means actuated by said actuator means and being adapted to clean a headlamp; passage means connected to said pump means and having parallel passages connected to said actuator means for communicating liquid to said actuator means and to said wiper means for dispensing liquid on said headlamp; and restriction means in said passage means for bypassing liquid from said passage means through the parallel passage to the headlamp and for maintaining the liquid pressure in said passage upstream of said restriction means at a level sufficient to operate said actuator means.

* * * * *